(12) United States Patent
Zimmerer et al.

(10) Patent No.: US 7,865,459 B2
(45) Date of Patent: Jan. 4, 2011

(54) INTEGRATION OF A SERVICE-ORIENTED TRANSACTION SYSTEM WITH AN INFORMATION STORAGE, ACCESS AND ANALYSIS SYSTEM

(75) Inventors: Peter K. Zimmerer, Walldorf (DE); Christian Dressler, Walldorf (DE)

(73) Assignee: SAP AG, Walldorf (DE)

( * ) Notice: Subject to any disclaimer, the term of this patent is extended or adjusted under 35 U.S.C. 154(b) by 547 days.

(21) Appl. No.: 11/671,940

(22) Filed: Feb. 6, 2007

(65) Prior Publication Data
US 2008/0189438 A1 Aug. 7, 2008

(51) Int. Cl.
G06F 7/00 (2006.01)
G06F 17/00 (2006.01)

(52) U.S. Cl. ..................... 707/602; 707/607
(58) Field of Classification Search .............. None
See application file for complete search history.

(56) References Cited

U.S. PATENT DOCUMENTS

| | | | | |
|---|---|---|---|---|
| 6,792,431 B2 * | 9/2004 | Tamboli et al. | ............ | 707/102 |
| 2003/0084053 A1 * | 5/2003 | Govrin et al. | ............... | 707/100 |
| 2003/0233397 A1 * | 12/2003 | Katz et al. | .................. | 709/200 |
| 2005/0120051 A1 * | 6/2005 | Danner et al. | ............ | 707/104.1 |
| 2006/0089939 A1 * | 4/2006 | Broda et al. | ................ | 707/100 |
| 2007/0022093 A1 * | 1/2007 | Wyatt et al. | .................... | 707/2 |
| 2008/0059604 A1 * | 3/2008 | Brunnabend et al. | ........ | 709/217 |
| 2008/0140692 A1 * | 6/2008 | Gehring | ...................... | 707/101 |

* cited by examiner

*Primary Examiner*—Neveen Abel Jalil
*Assistant Examiner*—Raheem Hoffler
(74) *Attorney, Agent, or Firm*—Mintz, Levin, Cohn, Ferris, Glovsky & Popeo, P.C.

(57) ABSTRACT

The present disclosure includes systems and techniques relating to integration of a service-oriented transaction system with an information storage, access and analysis system, such as a Business Intelligence (BI) infrastructure. In general, in some implementations, a data transformation interface and a data transfer interface can be configured to effect data exchange between a computer-based information storage, access and analysis system including a second data model, and a computer-based service-oriented transactional system including a first data model. The data transformation interface and the data transfer interface can be configured to communicate through a decoupled information exchange that separates program implementation details of the data transfer interface from the data transformation interface. Furthermore, in some implementations, an agent framework can be used to decouple data transformation from data transfer, where the agent framework includes a generic agent and application specific agents.

24 Claims, 3 Drawing Sheets

---

410 — Initiate one or more program agents to transform transactional data in a first format from a service-oriented transactional system into a second format 420 — Receive the transactional data in the second format from the one or more program agents 430 — Determine one or more locations to write the transactional data for transfer to a business data warehousing system

INTEGRATION OF A SERVICE-ORIENTED TRANSACTION SYSTEM WITH AN INFORMATION STORAGE, ACCESS AND ANALYSIS SYSTEM

BACKGROUND

The present disclosure describes systems and techniques relating to integrating computing systems, for example, integration of a service-oriented transaction system with an information storage, access and analysis system.

Companies increasingly collect large amounts of operational data (e.g., product sales data) regarding their business activities. Providing efficient analysis of, access to, and storage for such data can be an important element in improving business operations. For example, computer-based business intelligence (BI) systems often employ data warehousing techniques to extract information from operational data, perform automated analysis of extracted information and then provide the analyzed information in a data warehouse (separate from the storage of the original operational data) so that end-users can query the analyzed information and make business decisions based on the analyzed information.

A traditional approach to integrating such systems involves providing an application program interface (API) that can be used by one system to extract data from another system, or to actively push data from one system to another system. Thus, an application can compile all the data that is relevant to a BI system and then write this data directly into the BI system (e.g., to a data input queue of the BI system) through the API. While this traditional system integration approach works, further improvements are desirable.

SUMMARY

The present disclosure includes systems and techniques relating to integration of a service-oriented transaction system with an information storage, access, and analysis system, such as a Business Intelligence (BI) infrastructure. The described systems and techniques can result in transformation of a transactional data model to a BI data model that is consistently integrated within data replication and direct data access use cases. Data replication can be realized with a delta initialization and a consistent transition to and within a sequence of delta replications. Moreover, the described architecture can provide the flexibility to support very specific transformations (with respect to performance and/or complexity) as needed by dedicated implementations, as well as generic model-based implementations. Data transformation and data transfer can be clearly and tidily separated to realize an improved integration of systems having different data models.

By providing a transactional system with data transfer that is model based, data processing can be more generically defined, allowing later changes and improvements to the data transfer components to be more readily implemented. The application program interface used for transforming data to an appropriate format for a BI system can be decoupled from a data transfer queuing system, which can allow further improvements to be made to the queuing system without requiring changes to the data transformation interface.

According to an aspect of the described systems and techniques, an apparatus includes a computer-readable medium encoding a computer program product including a data integration component including: a data transformation interface; and a data transfer interface; wherein the data transformation interface and the data transfer interface are configured to effect data exchange between a service-oriented transactional system including a first data model and a computer-based information storage, access and analysis system including a second data model; and the data transformation interface and the data transfer interface are configured to communicate through a decoupled information exchange that separates program implementation details of the data transfer interface from the data transformation interface.

The data transformation interface can include multiple program agents configured to assist conversion of data from the first data model to the second data model; and the data transfer interface can include an agent controller configured to interact with the multiple program agents to receive and transfer data between the computer-based service-oriented transactional system and the computer-based information storage, access and analysis system. The computer-based service-oriented transactional system can include an online transaction processing (OLTP) system, and the computer-based information storage, access and analysis system can include a business intelligence system. The agent controller can include a component of the business intelligence system included in the OLTP system. The first data model can include a object-oriented normalized data model, and the second data model can include key-figure-oriented denormalized data model. Moreover, the multiple program agents can include a generic model-based transformation agent and multiple application specific transformation agents.

According to another aspect of the described systems and techniques, a method includes initiating one or more program agents configured to interface with a service-oriented transactional system and configured to transform transactional data in a first format from the service-oriented transactional system into a second format; receiving the transactional data in the second format from the one or more program agents; and determining one or more locations to write the transactional data for transfer to a business data warehousing system, such as a business intelligence (BI) system.

The receiving and the determining can include effecting delta data replication between the service-oriented transactional system and the business data warehousing system. The delta data replication can include detecting a change in the transactional data in the first format; and generating a business data view in the second format, derived from the first format, in response to the detected change in the business data warehousing system. The business data view can include a counter component for use in determining one or more most recent aggregates; and a change mode component. The determining can include identifying a data transfer queue for the business data warehousing system. Additionally, the initiating can include initiating a generic model-based transformation agent and multiple application specific transformation agents.

The described systems and techniques can be implemented in electronic circuitry, computer hardware, firmware, software, or in combinations of them, such as the structural means disclosed in this specification and structural equivalents thereof. This can include a program operable to cause data processing apparatus (e.g., one or more computers) to perform operations described. Thus, program implementations can be realized from a disclosed method, system, or apparatus, and apparatus implementations can be realized from a disclosed system, program, or method. Similarly, method implementations can be realized from a disclosed system, program, or apparatus, and system implementations can be realized from a disclosed method, program, or apparatus.

Thus, according to another aspect of the described systems and techniques, a system can include a computer-based service-oriented transactional system including a first data model; and a computer-based business intelligence system including a second data model; wherein the computer-based business intelligence system integrates with the computer-based service-oriented transactional system using a data integration component including a data transformation interface and a data transfer interface; the data transformation interface and the data transfer interface being configured to communicate through a decoupled information exchange that separates program implementation details of the data transfer interface from the data transformation interface.

The data transformation interface can include multiple program agents configured to assist conversion of data from the first data model to the second data model; and the data transfer interface can include an agent controller configured to interact with the multiple program agents to receive and transfer data between the computer-based service-oriented transactional system and the computer-based business intelligence system. The computer-based service-oriented transactional system can include an online transaction processing (OLTP) system. The agent controller can include a component of the computer-based business intelligence system included in the computer-based service-oriented transactional system. The first data model can include object oriented normalized data model, and the second data model can include a key-figure-oriented denormalized data model. Moreover, the multiple program agents can include a generic model-based transformation agent and multiple application specific transformation agents.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

These and other aspects will now be described in detail with reference to the following drawings.

Like reference numbers and designations in the various drawings indicate like elements.

DETAILED DESCRIPTION

Figure 1:
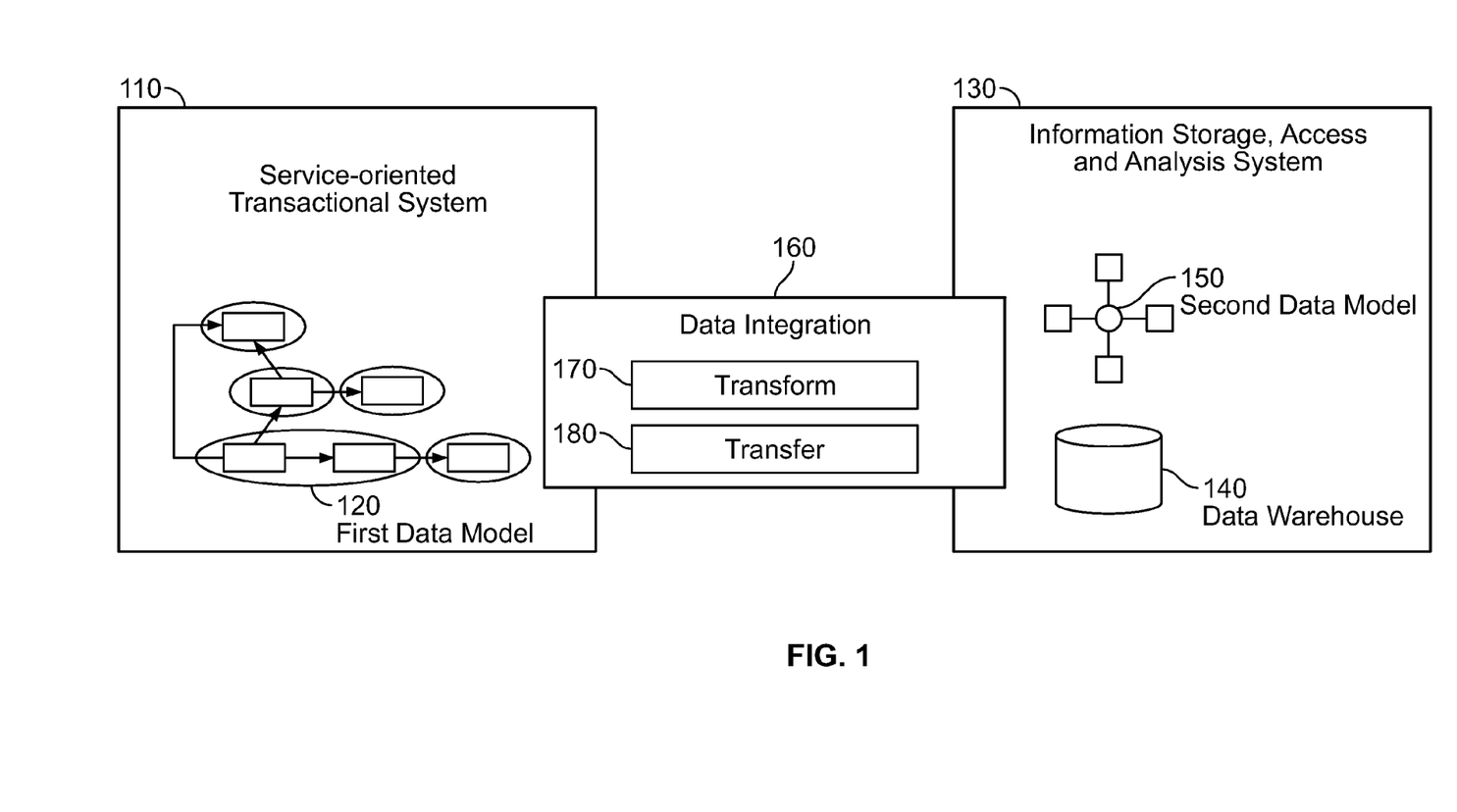
FIG. 1 shows an example system including an integrated analysis and transactional system.

FIG. 1 shows an example system including a computer-based service-oriented transactional system 110 and a computer-based information storage, access and analysis system 130. The system 110 can include an online transaction processing (OLTP) system. The system 110 can include a first data model 120. The first data model can include an object-oriented normalized data model. The first data model can further include business objects (BO). Each BO is a uniquely identifiable (business) entity and consists of a business object node (BON). A BON can include a set of semantically related attributes of a BO and can be defined by a structured data type having components that are associated by a 1:1 or a 1:0 ... 1 cardinality to the BON instance, i.e., no multi-valued attributes. An instance of a BON can be uniquely identified by a node ID. The combination of the name of the BO, the name of the BON, and the node ID can uniquely define a BON instance within the first data model. A BON can also include a semantic key which can be defined by a subset of its attributes. Each BO can include at least a particular BON called root node (RN) with a 1:1 correspondence between an instance of the BO and an instance of its RN. A BO can consist of child BONs. Each child BON can be associated by a composition relation to another parent BON of the same BO. Additional associations can exist between BONs of the same BO or even between BONs of different BOs.

The system 130 can include a data warehouse 140 and a second data model 150. The system 130 can include a business intelligence (BI) system. The data warehouse 140 can include multiple databases and access methods. Moreover, the second data model can include a key-figure-oriented denormalized data model. The second data model can include BI views (BIV) which can be derived from the first data model. A BIV can be typically defined by joins over multiple BONs of the same BO, based on associations within the first data model. A BIV can be related to at least one BO such that changes to a related BO induces changes to the BIV. A BIV can include a key which is a subset of components which uniquely identify an instance of the BIV.

A BIV can include at least two technical non-key components, an entity counter (EC), which can be an integer number, and a change mode (CM) which can be based on an enumeration type of the values 'Create', 'Update', and 'Delete'. The EC is a technical key figure of all items/instances of the BIV. The EC value can be set to 0 for all potential but yet non-existent BIV instances and to 1 for all existing BIV instances. If a new instance of the BIV has to be created due to changes of the first data model, the key figure can be increased from 0 to 1. If an instance is deleted, the key figure can be decreased from 1 to 0. Thus, instead of physically deleting a BIV instance the EC value of the instance can be set to 0. If an instance is updated (i.e. only non-identifying components are changed) the key figure can be kept constant at 1. If this key figure is included in an arbitrary aggregate of the BIV by sum aggregation, the resulting aggregate value can be a non-negative integer number just counting the number of BIV instances contributing to the aggregate instance. Aggregates can be materialized reflecting a snapshot of the BIV. If a transactional change happens to the first data model, a BI Agent can calculate delta records for its associated BIV. If a BIV instance has to be created, one delta record can be created as an after image. If a BIV instance is updated, two delta records can be created as a before image and an after image. If a BIV instance is deleted, one delta record can be created as a before image. In a delta record the EC can be included as an integer number reflecting the change of the EC within a BIV instance. For example, the after image of a creation can have a CM "C", and an EC "+1". The before image of an update can have a CM of "U", and an EC of "−1". The after image of an update can have a CM of "U", and an EC of "+1". The before image of a deletion can have a CM of "D", and an EC of "−1". All other components of an after image can have the state of the BIV instance after the creation or the update, respectively. All other components of a before image can have the state of the BIV instance before the update or the deletion, respectively.

A most recent aggregate of a BIV can be calculated from the union of a previously materialized aggregate and the delta records of all transactions which have not been included in the materialized aggregate so far. The EC can always be included directly in this aggregate by sum aggregation. For all components from the delta records which can be aggregated, except the EC itself, the component value can contribute directly to the aggregate if EC=+1 and can contribute by its inverse value if EC=−1. In case of sum aggregation, the product of the component value with the EC can be used for all kinds of images. The EC can be included as a technical component and as an integer number into a second data model (BIV) in order to use it for efficient calculation of most recent aggregates. Alternatively, or in addition, the EC can be used to detect and eliminate deleted instances in an incrementally calculated sum aggregate, e.g., starting from an initially materialized aggregate and only adding delta/change records. Other aggregation functions beside sum aggregation can be used if the underlying operation is invertible. Such aggregation functions can include, for example, $c^{EC}$, if the aggregation function is a product. From the most recent aggregate calculated, all instances having an aggregate value of 0 for the EC can be removed. An aggregate value of 0 for the EC can indicate that no instances from the first data model contribute to the aggregate instance.

The system 110 integrates with the system 130 using a data integration component 160, which can include a data transformation interface 170 and a data transfer interface 180. The data transformation interface 170 and the data transfer interface 180 can be configured to communicate through a decoupled information exchange that separates program implementation details of the data transfer interface 180 from the data transformation interface 170. Thus, data transform can be decoupled from data transfer, allowing for further changes or improvements to be made to either the data transformation interface 170 or the data transfer interface 180, without requiring program changes be made to the other.

For example, the data transformation interface 170 can include multiple program agents configured to assist conversion of data from the first data model 120 to the second data model 150. The data transfer interface 180 can include an agent controller configured to interact with the multiple program agents to receive and transfer data between the computer-based service-oriented transactional system 110 and the computer-based information storage, access and analysis system 130. The multiple program agents can include a generic model-based transformation agent and one or more application specific transformation agents, as described further below. Moreover, the various program elements of the data integration component 160 can overlap between the systems 110 and 130, including being considered part of one system while also being located within the other system.

Figure 2:
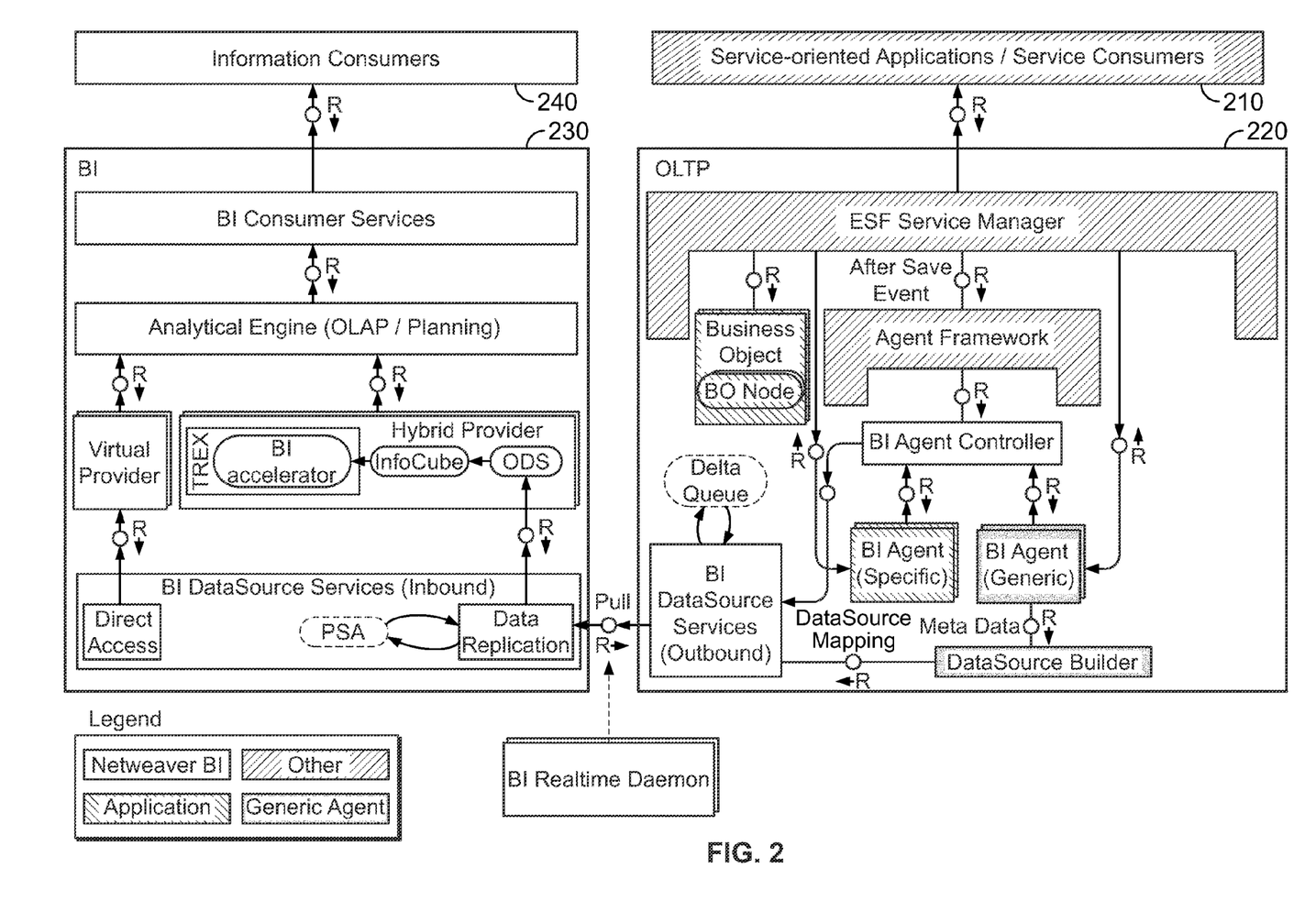
FIG. 2 shows a detailed example of an integrated business intelligence (BI) and online transaction processing (OLTP) system.

FIG. 2 shows a detailed example of an integrated business intelligence (BI) 230 and online transaction processing (OLTP) 220 system. An OLTP system 220 conducts transaction processing via computer network (e.g., the Internet, mobile networks, enterprise networks, or combinations of one or more of them). The OLTP system 220 can be connected with service-oriented applications and service consumers 210 that can include data access interfaces, such as enterprise search components (e.g., a structured query interface) and list patterns components (e.g., Object Work List (OWL) built using SAP List Viewer (ALV) and Web Dynpro, available from SAP AG of Walldorf, Germany). The BI system can interact with information consumers 240 (e.g., dashboards, analysis patterning systems, information consumer patterning system, formatted reporting systems, and the like).

The OLTP system 220 can include an enterprise services framework used to interconnect service providers and service consumer for transactional processing. The system 220 can also include a process agent framework to exchange data between the enterprise services framework and a BI agent controller, such as after a save event in the system 220.

Figure 3:
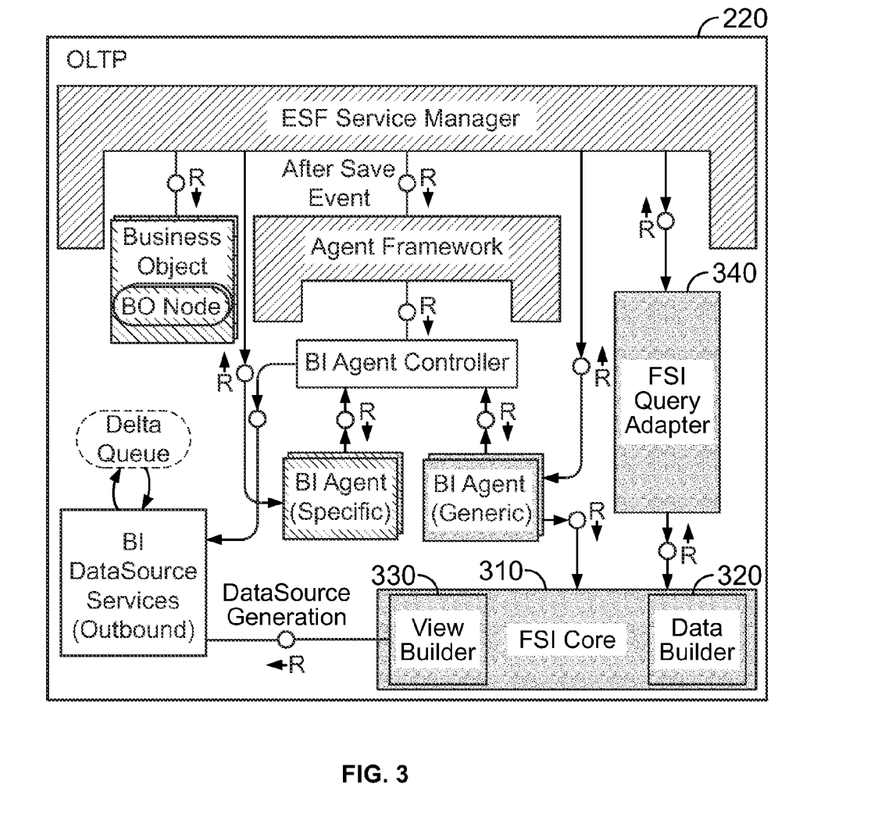
FIG. 3 shows an example of the OLTP system integrated with a fast search index (FSI) system.

FIG. 3 shows an example of the OLTP system integrated with a fast search index (FSI) system. The OLTP system 220 can be integrated with a Fast Search Index (FSI) system that can include a search and classification component, such as TREX (available from SAP AG of Walldorf, Germany) including a business object (BO) node index. The FSI system can also include an FSI core 310, with data source builder 320, view builder 330, and FSI runtime components. Moreover, the FSI system can include an FSI query adapter 340 (supporting query call exchange) and a generic BI agent (e.g., purely model-based).

The OLTP system 220 can include additional program elements associated with various systems within the framework of the OLTP system 220. FIG. 2 is coded to show an example system configuration, and Table 1 below specifies the example program element associations.

TABLE 1

Example Program Element Associations

| Associated Program Elements | Pattern |
|---|---|
| BI System |  |
| Generic BI Agent |  |
| Application |  |
| Other |  |

As shown in this example, the generic BI agent can be associated with an independent software component, while the BI agent controller can be associated with the BI system, and one or more specific BI agents can be associated with respective applications, which have related business objects including BO node(s). The OLTP system and the BI system can be designed using BEX (Business Explorer) Design Tools and a visual composer (both able from SAP AG of Walldorf, Germany). The BEX Design Tools can place executable applications on the visual composer that can be stored in an Enterprise Services Repository. During runtime, the OLTP system can operate in the presence of the FSI query adapter or the classification and search component.

Program element associations other than those shown are also possible, but in general, the agent framework shown in FIGS. 2 and 3 can provide improvements in data exchange between an OLTP system and a BI system. Applications can interact with the BI agents to compile and transform the data to be sent to the BI system. These BI agents can in turn send the data to the BI agent controller, which makes the decisions regarding how and to which portion of the BI system the data is then written (e.g., to a BI system data transfer queue).

The BI agents can access the first data model through a set of standardized core services. Core services required for BI agents can include retrieve, retrieve by association, and query. Retrieve returns a list of BON instances for a given list of Node IDs. In a transactional environment, these instances can either be requested as before-images, i.e., state that was read from the database before transactional changes have been applied, or as after-images, i.e., current state of the transaction. Retrieve by association returns a list of BON instances for a list of node IDs of another BON which are related to the node IDs of the first BON by an association. In a transactional environment, these instances can either be requested as before-images or after-images. Multiple queries can be defined for a BON. They return either a list of node IDs for this BON or a list of BON instances. A query definition can include a set of attributes which can be used to pass selection conditions to the query which can be used to restrict the number of returned node IDs.

The BI agents can access the second data model by the selective snapshot method. A list of BIV instances is returned for a given projection (subset of columns of the BIV) and a given selection based on a subset of columns of the BIV that are enabled for selection. A selective snapshot can be used for a one-time data replication. Other access methods for the second data model can include delta initialization, delta request, repetition of a delta request, and direct access. A delta initialization request starts a sequence of incremental data replications by transferring either all instances of a BIV or a subset. A delta initialization request is followed by a series of delta requests. Each delta request contains change information for all instances of the associated BIV that have been created, updated, or deleted since the preceding delta request or since the start of the delta initialization request, if it is the first delta request for a BIV. The repetition of a delta request is the repetition of a failed delta request. Direct access is the projected, aggregated, and selective snapshot for a BIV without the aim of data replication.

A given application can provide a given functionality to an end user. Additionally, a given application can use either the generic BI agent or a specific BI agent designed for that application. The decision regarding whether to use the generic agent or an implemented specific agent can be based on performance versus implementation time. For example, if performance is of greater importance, a detailed specific agent can be programmed for a given application; if reduced implementation time is of greater importance, a modeled agent can be defined for the given application, and the generic agent can then be used to interpret this model and process the data. Other approaches are also possible, and the agent framework described here can provide the versatility to handle many different access methods for applications to transform data into a format appropriate for the BI system.

Moreover, this agent framework allows changes to be readily made to the data transfer itself. In the example shown, the BI agent controller transfers the transformed data to an outbound BI data source services component with delta queue. A BI real-time daemon can then pull this data from the OLTP system 220 into a main portion of the BI system 230. However, alternative data transfer components can be used, including multiple data transfer components from which the BI agent controller can select for given data to be transferred. For example, multiple types of BI data transfer queues can be available, and the BI agent controller can select which queue to use for a given set of data.

The system incorporating this agent framework can be more readily updated and improved. If additional data transfer components are added later, or if changes are made to existing data transfer components for the BI system 230, only the BI agent controller need be changed. The BI agents can remain unchanged and still operate properly in the new system. The BI agents can be responsible for getting the real changes out of the transactions in the OLTP system 220 and transforming these to a format appropriate for the BI system (e.g., a business warehouse data structure). In the case of a selective snapshot, delta initialization, and direct access, a BI agent transforms an isolated snapshot of the first data model to the second data model. As long as the data in the first data model does not change, this transformation should give repeatable results for all BIVs within the second data model. In case of an isolated transactional change to the first data model, a BI agent has to calculate delta instances for a BIV from a snapshot before the change and a snapshot after the change. The BI agents can leave the task of data transfer to the BI agent controller. The BI agent controller acts as an exclusive receiver for the BI agent. The BI agent controller can make use of various distribution and queuing techniques for serializing delta information. Thus, data transformation can be decoupled from data transfer, and post-processing of the data (e.g., writing the data to a queue and then posting the data to a business warehouse) can be changed without changing the program logic of the generic and specific agents.

The queuing system used by the BI system can employ an asynchronous communication including transactional queuing remote function call (RFC) techniques. The communication protocol can guarantee that each call of the transactional queuing RFC is executed (in a transactional sense) only once, and in order. Other queuing systems are also possible.

The BI system 230 can include an inbound BI data source services component, including data replication, persistent staging area (PSA), and direct access components. The BI system 230 can include a hybrid provider, including operational data store (ODS) object, an info cube, and a TREX component with BI accelerator. The BI system 230 can include a virtual provider to connect with the direct access component. The BI system 230 can include an analytical engine, for online analytical processing (OLAP) and planning support, and also a BI consumer services component. The BI consumer services component can connect with data access interfaces, which can include dashboards, analysis pattern, information consumer pattern and formatted reports user interfaces.

Figure 4:
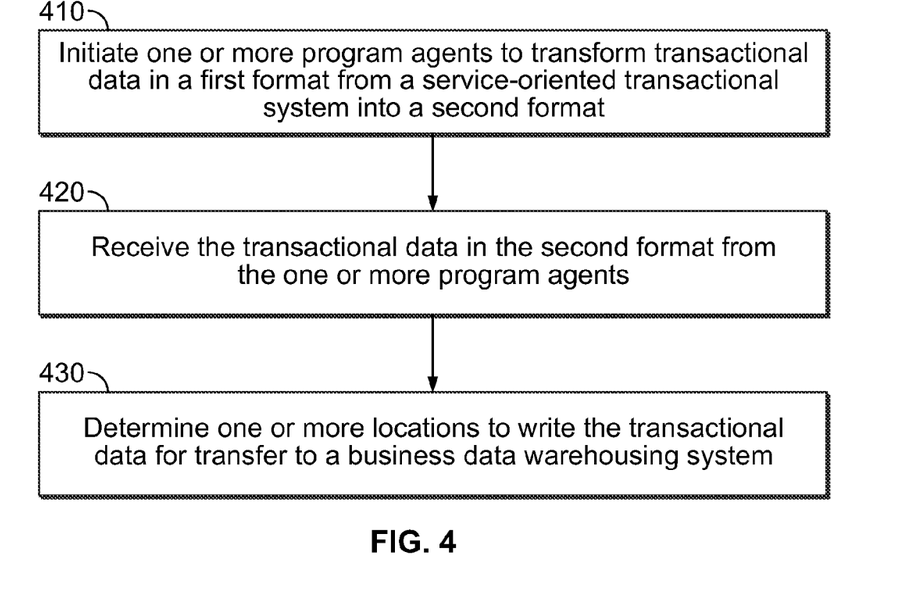
FIG. 4 shows an example process of systems data integration according to the described subject matter.

FIG. 4 shows an example process of systems data integration according the described subject matter. One or more program agents can be initiated at 410. The program agent(s) can be configured to interface with a service-oriented transactional system and configured to transform transactional data in a first format from the service-oriented transactional system into a second format. The initiating can include initiating a generic model-based transformation agent and multiple application specific transformation agents, such as described above.

The transactional data (in the second format after transformation) can be received at 420 from the one or more program agents. One or more locations to write the transactional data for transfer to a BI system can be determined at 430. The determining can include identifying a data transfer queue for the BI system. Moreover, the receiving and the determining can include effecting delta data replication between the service-oriented transactional system and the BI system. For example, the receiving and the determining can be performed by a BI agent controller, such as that shown and described above in connection with FIGS. 2 and 3.

Various implementations of the described subject matter (and all of the functional operations described in this specification) can be implemented in digital electronic circuitry, or in computer software, firmware, or hardware, including the structures disclosed in this specification and their structural equivalents, or in combinations of one or more of them. Variations of the described subject matter can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, variations of the described subject matter can be implemented using computers having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Variations of the described subject matter can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the described subject matter, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this description contains many specifics, these should not be construed as limitations on the scope of the described subject matter or of what may be claimed, but rather as descriptions of features specific to particular variations of the described subject matter. Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the various implementations described above should not be understood as requiring such separation in all implementations, and it should be understood that the described program components and systems can generally be integrated together in a single software product or packaged into multiple software products.

Although a few variations have been described in detail above, other modifications are possible and are within the scope of the following claims. For example, the actions recited in the claims can be performed in a different order and still achieve desirable results.

What is claimed is:

1. A computer-implemented method comprising:
receiving, at a data integration component, a first change and a subsequent second change to transactional data of one or more data objects in a first data model of a service-oriented transactional system, the service-oriented transactional system comprising a first data format, the data integration component comprising a data transformation interface comprising a program agent and a data transfer interface comprising an agent controller;
transforming, by the program agent, the transactional data of the data object from the first format into a second format of a business data warehousing system that comprises a business intelligence view derived from the first data model, the business intelligence view relating to the data object in the first data model such that changing the data object induces changing the business intelligence view;
creating, by the program agent, a first delta record indicating first changes from a current instance of the business intelligence view caused by the first change to the transactional data, and a second delta record indicating second changes from the current instance of the business intelligence view caused by the second change to the transactional data;
joining the second delta record with the first delta record and any other previously created delta records that have not yet been applied to the current instance of the business intelligence view, the joining generating a joined delta record;
calculating an aggregated new instance of the business intelligence view based on the current instance of the business intelligence view and the joined delta record;
determining, by the agent controller, one or more locations to write the transactional data for transfer to the business data warehousing system based on the aggregated new instance of the business intelligence view; and
transferring, by the agent controller interacting with the program agent, the transactional data of the data object in the second format from the service-oriented transactional system to the one or more locations at the business data warehousing system.

2. The method of claim 1, further comprising effecting delta data replication between the service-oriented transactional system and the business data warehousing system.

3. The method of claim 2, wherein the delta data replication comprises:
detecting a change in the transactional data in the first format; and
generating a business data view in the second format, derived from the first format, in response to the detected change in the business data warehousing system.

4. The method of claim 3, wherein the business data view comprises:
a counter component for use in determining one or more most recent aggregates; and
a change mode component.

5. The method of claim 1, wherein the determining comprises identifying a data transfer queue for the business data warehousing system.

6. The method of claim 1, wherein the initiating comprises initiating a generic model-based transformation agent and multiple application specific transformation agents.

7. A computer program product, encoded on a computer-readable storage medium, operable to cause data processing apparatus to perform operations comprising:
receiving, at a data integration component, a first change and a subsequent second change to transactional data of one or more data objects in a first data model of a service-oriented transactional system, the service-oriented transactional system comprising a first data format, the data integration component comprising a data transformation interface comprising a program agent and a data transfer interface comprising an agent controller;
transforming, by the program agent, the transactional data of the data object from the first format into a second format of a business data warehousing system that comprises a business intelligence view derived from the first data model, the business intelligence view relating to the data object in the first data model such that changing the data object induces changing the business intelligence view;
creating, by the program agent, a first delta record indicating first changes from a current instance of the business intelligence view caused by the first change to the transactional data, and a second delta record indicating second changes from the current instance of the business intelligence view caused by the second change to the transactional data;
joining the second delta record with the first delta record and any other previously created delta records that have not yet been applied to the current instance of the business intelligence view, the joining generating a joined delta record;
calculating an aggregated new instance of the business intelligence view based on the current instance of the business intelligence view and the joined delta record;
determining, by the agent controller, one or more locations to write the transactional data for transfer to the business data warehousing system based on the aggregated new instance of the business intelligence view; and
transferring, by the agent controller interacting with the program agent, the transactional data of the data object in the second format from the service-oriented transactional system to the one or more locations at the business data warehousing system.

8. The computer program product of claim 7, wherein the operations further comprise effecting delta data replication between the service-oriented transactional system and the business data warehousing system.

9. The computer program product of claim 7, wherein the delta data replication comprises:
detecting a change in the transactional data in the first format; and
generating a business data view in the second format, derived from the first format, in response to the detected change in the business data warehousing system.

10. The computer program product of claim 9, wherein the business data view comprises:
a counter component for use in determining one or more most recent aggregates; and
a change mode component.

11. The computer program product of claim 7, wherein the determining comprises identifying a data transfer queue for the business data warehousing system.

12. The computer program product of claim 7, wherein the initiating comprises initiating a generic model-based transformation agent and multiple application specific transformation agents.

13. A system comprising:
at least one programmable processor configured to implement a computer a computer-based service-oriented transactional system comprising a first data model; and a computer-based business intelligence system comprising a second data model, the computer-based business intelligence system integrating with the computer-based service-oriented transactional system using a data integration component comprising a data transformation interface and a data transfer interface, the integrating comprising forming business intelligence views relating to one or more data objects in the first data model such that a first and a subsequent second change to transactional data of the one or more data objects induce changing the business intelligence view; wherein the data transformation interface comprises a program agent that transforms transactional data of a data object in the first data model from a first format of the computer-based service-oriented transactional system into a second format of the computer-based intelligence system, the program agent creating a first delta record indicating changes from a current instance of the business intelligence view caused by the first change to the transactional data, and a second delta record indicating second changes from the current instance of the business intelligence view caused by the second change to the transactional data, joining the second delta record with the first delta record and any other previously created delta records that have not yet been applied to the current instance of the business intelligence view to generate a joined delta record, and calculating an aggregated new instance of the business intelligence view based on the current instance of the business intelligence view and the joined delta record;

the data transfer interface comprises an agent controller that determines one or more locations to write the transactional data for transfer to the computer-based business intelligence system based on the aggregated new instance of the business intelligence view and transferring, in conjunction with the program agent, the transactional data of the data object in the second format from the service-oriented transactional system to the one or more locations at the computer-based business intelligence system, and the data transformation interface and the data transfer interface communicating through a decoupled information exchange that separates program implementation details of the data transfer interface from the data transformation interface.

14. The system of claim 13, wherein the data transformation interface comprises one or more additional program agents configured to assist conversion of data from the first data model to the second data model; and the agent controller is configured to interact with the program agent and the one or more additional program agents to receive and transfer data between the computer-based service-oriented transactional system and the computer-based business intelligence system.

15. The system of claim 14, wherein the computer-based service-oriented transactional system comprises an online transaction processing (OLTP) system.

16. The system of claim 14, wherein the agent controller comprises a component of the computer-based business intelligence system included in the computer-based service-oriented transactional system.

17. The system of claim 14, wherein the first data model comprises object oriented normalized data model, and the second data model comprises a key-figure-oriented denormalized data model.

18. The system of claim 14, wherein the multiple program agents comprise a generic model-based transformation agent and multiple application specific transformation agents.

19. An apparatus comprising a machine readable storage medium encoding a computer program product including a data integration component comprising:

a data transformation interface comprising a program agent, the program agent transforming transactional data of one or more data objects in a first data model of a computer-based service-oriented transactional system from a first format into a second format of a computer-based information storage, access and analysis system that comprises a business intelligence view derived from the first data model, the business intelligence view relating to the one or more data objects in the first data model such that a first and a subsequent second change to transactional data of the one or more data object induce changing the business intelligence view, the program agent further creating a first delta record indicating changes from a current instance of the business intelligence view caused by the first change to the transactional data, and a second delta record indicating second changes from the current instance of the business intelligence view caused by the second change to the transactional data, joining the second delta record with the first delta record and any other previously created delta records that have not yet been applied to the current instance of the business intelligence view to generate a joined delta record, and calculating an aggregated new instance of the business intelligence view based on the current instance of the business intelligence view and the joined delta record; and a data transfer interface comprising an agent controller, the agent controller determining one or more locations to write the transactional data for transfer to the business data warehousing system based on the aggregated new instance of the business intelligence view and transferring, in conjunction with the program agent, the transactional data of the data object in the second format from the service-oriented transactional system to the one or more locations at the computer-based information storage, access and analysis system; and wherein the data transformation interface and the data transfer interface communicate through a decoupled information exchange that separates program implementation details of the data transfer interface from the data transformation interface.

20. The apparatus of claim 19, wherein the computer-based service-oriented transactional system comprises an online transaction processing (OLTP) system, and the computer-based information storage, access and analysis system comprises a business intelligence system.

21. The apparatus of claim 20, wherein the agent controller comprises a component of the business intelligence system included in the OLTP system.

22. The apparatus of claim 19, wherein the first data model comprises a object-oriented normalized data model, and the second data model comprises a key-figure-oriented denormalized data model.

23. The apparatus of claim 19, wherein the data transformation interface further comprises one or more additional program agents that comprise a generic model-based transformation agent and multiple application specific transformation agents.

24. The method of claim 1, wherein the data transformation interface and the data transfer interface communicate though a decoupled information exchange separating program implementation details of the data transformation interface and the data transfer interface to allow a first programming change to one of the data transformation interface and the data transfer interface to occur without requiring a second program change to occur to the other of the data transformation interface and the data transfer interface.

* * * * *